(12) United States Patent  
Martin

(10) Patent No.: US 8,368,563 B2
(45) Date of Patent: Feb. 5, 2013

(54) PHYSICAL KEY INTERFACE

(76) Inventor: Neale Martin, Marietta, GA (US)

( * ) Notice: Subject to any disclaimer, the term of this patent is extended or adjusted under 35 U.S.C. 154(b) by 654 days.

(21) Appl. No.: 12/582,543

(22) Filed: Oct. 20, 2009

(65) Prior Publication Data

US 2010/0097247 A1    Apr. 22, 2010

Related U.S. Application Data

(60) Provisional application No. 61/106,794, filed on Oct. 20, 2008.

(51) Int. Cl.
*H03M 11/00* (2006.01)
(52) U.S. Cl. .......................................... 341/22; 345/169
(58) Field of Classification Search .............. 341/20–22; 345/169; 340/711
See application file for complete search history.

(56) References Cited

U.S. PATENT DOCUMENTS

| | | | | |
|---|---|---|---|---|
| 5,426,449 | A * | 6/1995 | Danziger | 345/168 |
| 6,132,118 | A * | 10/2000 | Grezeszak | 400/489 |
| 6,288,709 | B1 * | 9/2001 | Willner et al. | 345/169 |
| 7,088,339 | B2 * | 8/2006 | Gresham | 345/168 |
| 7,777,717 | B2 * | 8/2010 | Fux et al. | 345/156 |

* cited by examiner

*Primary Examiner* — Brian Young
(74) *Attorney, Agent, or Firm* — Lee & Hayes, PLLC

(57) ABSTRACT

A physical keyboard interface for controlling a computer device and methodology of use. The interface includes a body having an upper side, a lower side, a left end and a right end, with each of the left and right ends including an ergonomic hand grip. A display is on the upper side of the body and at least four finger keys are adjacent to each ergonomic hand grip on the lower side of the body that are configured for inputting at least alphanumeric characters into a computer device based upon physical interaction with one or more of the finger keys. At least one thumb key located on the upper side of the body adjacent to one of the ergonomic hand grips, and at least one thumb key is utilized as an input for controlling a function of a program executing on a computer device.

20 Claims, 3 Drawing Sheets

PHYSICAL KEY INTERFACE

CROSS-REFERENCE TO RELATED APPLICATIONS

This application claims the benefit of U.S. Provisional Application No. 61/106,794, filed Oct. 20, 2008, which is hereby incorporated by reference in its entirety.

TECHNICAL FIELD

This application relates to the field of keyboards, and more specifically, chorded keyboard interfaces.

BACKGROUND

The Information Revolution has been underway since Guttenberg's printing press debuted in 1455. The printing press made information cheap to produce and easy to distribute. The telephone in 1876 made it possible for instantaneous voice communications at a distance, and radio and television broadcasting in the early $20^{th}$ century, made it cost effective to distribute rich media, audio and video to a widely distributed audience. These inventions facilitated the transmission of information around the world.

The introduction of two technologies, personal computers and cell phones, have created another revolution in information. PCs greatly democratized information creation and management, and the advent of the Internet made it possible to create, access and distribute information globally. The cost of distributing information was reduced to the cost of connecting to the internet. Cell phones created nearly ubiquitous two-way communications, though early models were only voice enabled. The addition of mobility to telephony saw cellular eclipse landline telephones within 20 years of their commercial launch.

One problem with the advent of computers has been at the point of "data entry," where the user inputs data into the computer or computer device. The most common interface used to input data is a "keyboard, such as a QWERTY Keyboard, which presents a set of individual letters or characters that can be typed by pressing individual keys. However, for efficient data input, two hands must typically be used to type in the various letters and words.

A "chorded keyboard" is an input device that allows a user to enter characters or commands formed by pressing several keys together, typically on a single-hand interface, like playing a "chord" on a piano. The use of multiple key combinations allows a large number of combinations to be available from a small number of keys. This feature allows text or commands to be entered with great speed, and potentially with only one hand. However, chorded keyboards have been difficult for users to become familiar with and use efficiently. The ubiquity of QWERTY and other keyboards has also created significant resistance to the adoption and usage of chorded keyboards and other data interfaces.

SUMMARY

The present invention relates to a user interface that is easy to learn and use. The device allows the user to type more words per minute and with fewer errors than the user would be capable of using a QWERTY keyboard. In an embodiment of the invention, a user interface device has eight keys. The device has two ergonomic handgrips, each accommodating four fingers. Each of the eight keys is associated with a different finger in the handgrips. The device may have a display located on the top side of the device, opposite from the keys. The eight keys can be used for chorded text data entry, and the display can show the data entered by the user. There are at least two keys on the upper side of the device such that the user can press the keys with the thumbs. The keys on the upper side of the device may be used for such purposes as to input shifts, to input a space, to control a graphical mouse, to accept predictive text suggestions, or to input an enter/return.

These features will allow the device to be light and relatively low cost while having sufficient power to fill ordinary data input tasks required for typical computer-related functions while away from at the home or office.

DETAILED DESCRIPTION OF ILLUSTRATIVE EMBODIMENTS

Figure 1:
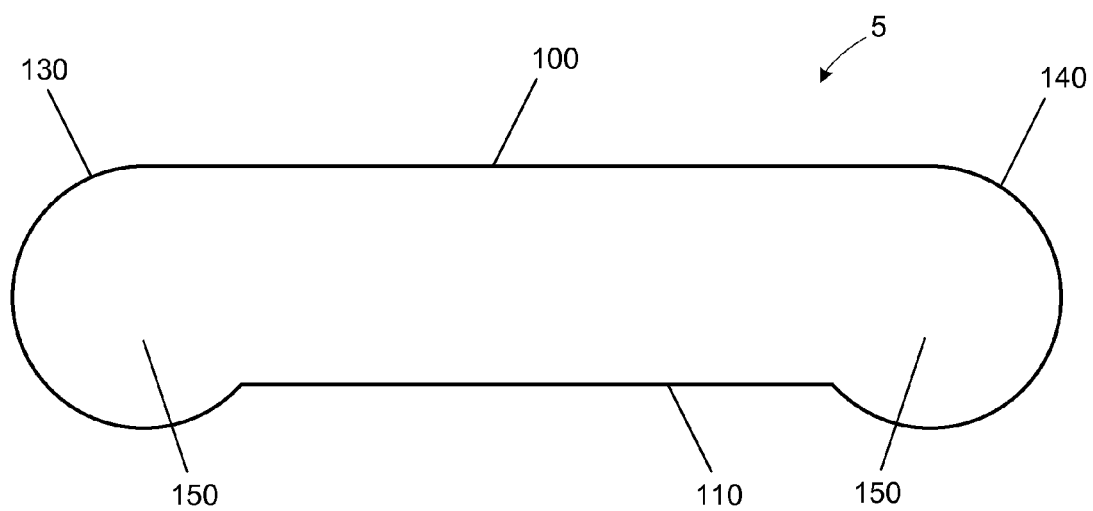
FIG. 1 depicts a top view of an example hand-held device.

The PC and cell phone have evolved along parallel lines. While PCs have become progressively smaller and more mobile, cell phones have added computer like functionality. However, the evolutionary lines of both technologies have led to dead ends as their legacy user interfaces (UI) have failed to adapt to new generations of tasks.

The PC became mobile with the advent of the laptop, a boon for traveling executives, students, and a myriad of other users. However, the legacy interface from the PC has become a key constraint on the usability of portable computers. The keyboard, which is exposed when the laptop is open, forces users to place the device on a table or desk to use it. Though mobile, these devices are not practical for a myriad of contexts because of the primary input mechanism, the QWERTY keyboard.

The computer industry has sought to address this design limitation along two paths—making the PC smaller, and using touch screens as primary input devices. The smaller devices, generally termed netbooks, sub-notebooks, or micro-PCs, maintain keyboards generally in QWERTY layout in a compressed form. Some manufacturers are focusing on this market notably OQO and FlipStart.

Other larger manufacturers, including Samsung, Sony, Asus, and HP, have made forays into this market. The compressed keyboards make traditional typing slightly more difficult and most of these devices still require a flat service upon which to park the portable computer. The FlipStart keyboard is so small that instead of conventional touch-typing, users can hold onto the device and use their thumbs. Both approaches make intense data input slow and frustrating.

In an attempt to address the legacy UI problem, the personal computer industry developed a new generation of tablet computers. Led by Microsoft and Intel, the Origami project attempted to make tablets mainstream through a better operating system and the option to use a keyboard or just the touch screen. Tablet computers have made inroads into niche markets, but the UI problem continues to limit its popularity. Users simply cannot use these devices for many of their routine tasks.

While the primary driver for the evolution of the PC has been portability, the addition of features has driven the evolution of the cell phone. Wireless voice service was the primary application for the first decade of cellular telephony. Mobile telephony started out as simply extending the utility of voice service while away from landlines. Thus the mobile phone UI mimicked that of the traditional phone set. However, when other applications beside voice were added to wireless telephony, the limitations of the handset became readily apparent.

More than a trillion text messages are sent from mobile phones annually. The two most common methods of inputting text are Multitap and T9. Both are slow (averaging 8 to 20 words per minute) and prone to errors. Although users adapted to using the number keypad to text message, the addition of wireless email made this UI obsolete.

The next evolutionary step of cell phones was the hybridization of handsets and personal digital assistants (PDAs) by Treo. These devices incorporated mini QWERTY keyboards at the base of the device. A host of devices from other manufacturers have employed mini QWERTY keyboards for business devices such as the RIM BlackBerry, Motorola Q and Samsung Blackjack. Numerous consumer devices emerged with hidden Qwerty keyboards that could be accessed by sliding, twisting, or flipping the handset to reveal the text-based UI. The HTC Touch, Apple iPhone, and Samsung Instinct are the first of a new generation of devices that use a soft Qwerty keyboard on the devices touch screen for data entry.

For users trained on mini QWERTY, these keyboards allow for faster and more accurate typing, but fall well below levels achieved with a conventional-size keyboard. Average speeds are roughly 30 to 45 words per minute with higher error rates than with a conventional keyboard.

As cell phones have added Internet access, media, gaming, and a host of other applications, the limitations of the UI are increasingly apparent. It is simply not practical to type more than a few lines on these devices, though many of them are capable of creating and editing word documents, spreadsheets, and presentations.

The advent of broadband wireless technology significantly expands the functionality of both laptop computers and cell phones. Current technologies, such as Wi-Fi and 3G, are already streaming video, emails with attachments, and music to both smartphones and portable PCs. The next generation of wireless technology, including WiMAX and LTE, promise to provide near ubiquitous access to high-speed Internet and bourgeoning business and consumer applications.

As broadband wireless technology expands, so will the applications that business and consumer markets will wish to access. The only thing limiting this market opportunity are the UI dilemmas previously outlined.

To understand how to resolve the seemingly intractable problem requires penetrating the assumptions behind legacy user interfaces. This requires an understanding of how the human brain solves tasks and learns to interact with digital interfaces.

Essentially, the brain has two separate learning mechanisms, a conscious executive system and an unconscious habitual system. Ultimately, for a UI to be successful, it must be mastered by the unconscious, habitual mind.

The history of the Qwerty keyboard is shrouded in misconception. While it is generally held that the keyboard was designed to slow down fast typing (which resulted in jammed keys), the reality is a bit more subtle. C.L. Sholes of Milwaukee developed an early typewriter whose keyboard was laid out alphabetically in two rows. This design led to unacceptable levels of key jamming. By physically separating letters often used in tandem (such as t and h, s and t, etc.), jams were significantly reduced. Though this layout did slow down typists, slowing down the typists was not the goal.

The limitations of the QWERTY keyboard have been long known and exhaustively chronicled. Several 'superior' keyboards have been developed and many have been patented—notably the Dvorak keyboard in 1936. Dvorak grouped the most frequently used letters on the home row, where the fingers rest. He also positioned the letters to increase the likelihood of alternating typing hands.

When Remington took Sholes' design and mass-produced the typewriter, the company shaped the future of the UI. Though the issue of jammed keys was resolved in later typewriter designs (notably the IBM Selectric ball typewriter and then word processors), the UI was ingrained in the habitual memory of millions of typists. The promise of being able to type faster was insufficient motivation for trained typists to relearn this skill, and new typists were indoctrinated by typing teachers and typing books centered around QWERTY. Dvorak's design was fighting against entrenched habits that had become second nature to millions.

It is critical to understand the persistence of the QWERTY keyboard to evaluate its successor. The human mind has two memory/learning systems. The executive mind learns consciously and typically intentionally. The habitual mind learns through repetition. As humans learn, specific neural pathways are strengthened. Habitual learning occurs in the basal ganglia and is etched in the striatum. This is important because habits are activated by cues in the environment and habitual behaviors often occur before or without conscious thought.

The Dvorak and other keyboards were not successful because they fought against habits that were engrained and repeated thousands of times. The executive mind thinks consciously about the words, and the habitual mind moves the fingers. Alternative keyboards—those that require the user to place their hands the same as they do on a QWERTY keyboard, but have a different arrangement of keys—activate all of the unconscious learning of strongly formed habits.

The mastery of a completely new UI is therefore far easier to accomplish than mastering a modification of an existing UI. The present invention avoids tapping into existing habitual behavior by completely removing the cues of the traditional keyboard. In addition, the present invention separates out the functions controlled by the fingers and thumbs in such a way that rapid mastery and habit formation are optimized.

Traditional keyboards are designed to work when one finger strikes one key. Each key represents a letter or a symbol. A second set of letters and symbols can be accessed via a shift key. The user learns to use this interface slowly over time as neural circuits are formed between hand placement and specific letters. With practice, proficient users can type 60 to 100 (or more) words a minute.

An alternative approach is to reduce the number of keys and therefore the need to master the complex movement of fingers over a keyboard. Instead of each finger strike representing one specific letter, multiple keys are struck nearly simultaneously to indicate a letter, similar to striking a chord on a piano. Chorded keyboards have been designed for one-handed and two-handed typing. Accordingly, several different chorded solutions have been developed with different numbers of keys.

The Handkey Corporation developed one-handed chorded devices called the Twiddler and Twiddler2. Twelve keys are arranged in four rows of three on the front of the keypad. The device is held in the palm of the hand and the keys face away from the user.

In extensive testing at the Georgia Institute of Technology, the Twiddler outperformed the similarly arranged 12-key layout of the cell phone's multi-tap text messaging. Not only does the one-handed solution outperform traditional phone handsets, but mini-Qwerty keypads as well. Subjects averaged 47 words per minute after several hours of training with fewer errors. For some users, one-handed typing with the Twiddler surpassed two-handed typing on a conventional word processor.

An advantage of chorded keyboards is that common letter groupings like 'ing' and common words, like and, the, and but can be assigned a chord. When subjects practiced with these added chords, typing speeds increased to 137 words per minute.

The PC and cell phone industries have struggled to develop successful new devices to take advantage of nascent broadband wireless technology. Cell phone manufacturers have crammed more functions and applications into devices that fit in a pocket, while PC manufacturers continue to shrink their powerful machines. Both approaches are inherently flawed because designers carry over legacy interfaces from the typewriter (via the PC) and the phone dial pad.

There is a significant opportunity to create a new device that sheds the baggage of its predecessors while carrying forward their best attributes. Most importantly, the advent of broadband wireless will create a plethora of new applications for a device that is both highly portable and easy to use in a variety of settings.

The important criteria for this device is a screen that will enable the user to perform a wide variety of tasks and access a wide variety of content combined with a UI that will allow the user to perform information-intensive work without the need of a table or desk. For this device to be successful, it must be constructed to work with both the user's conscious, executive mind and unconscious, habitual mind. To accomplish this, the UI must not compete with existing habits while simultaneously being intuitive and easy to learn.

Figure 2:
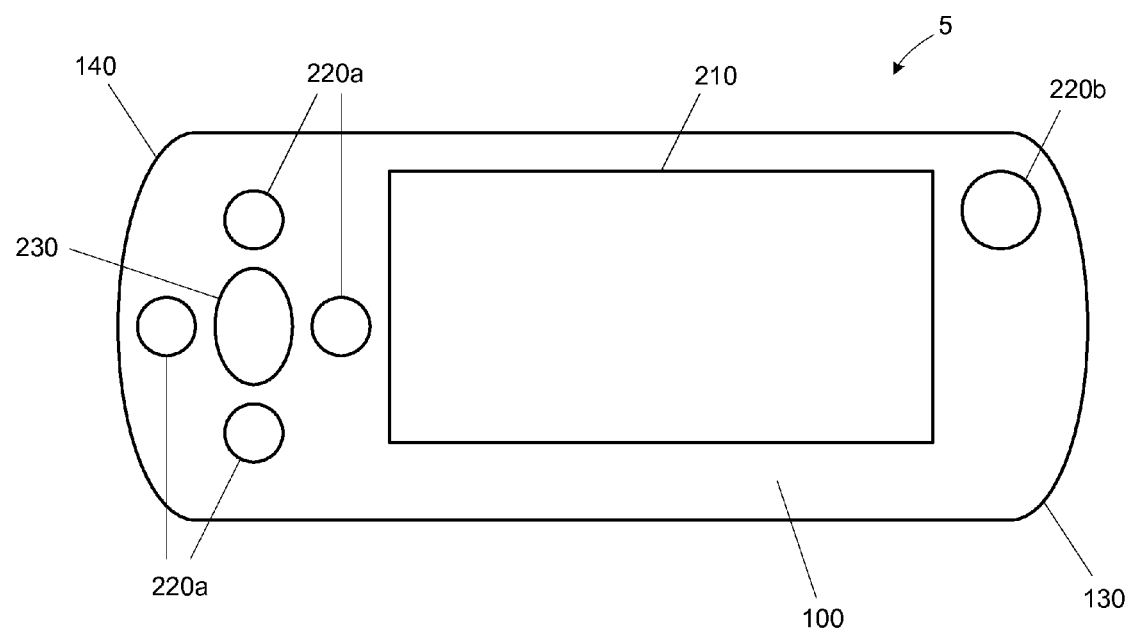
FIG. 2 depicts a front view of an example hand-held device.
Figure 3:
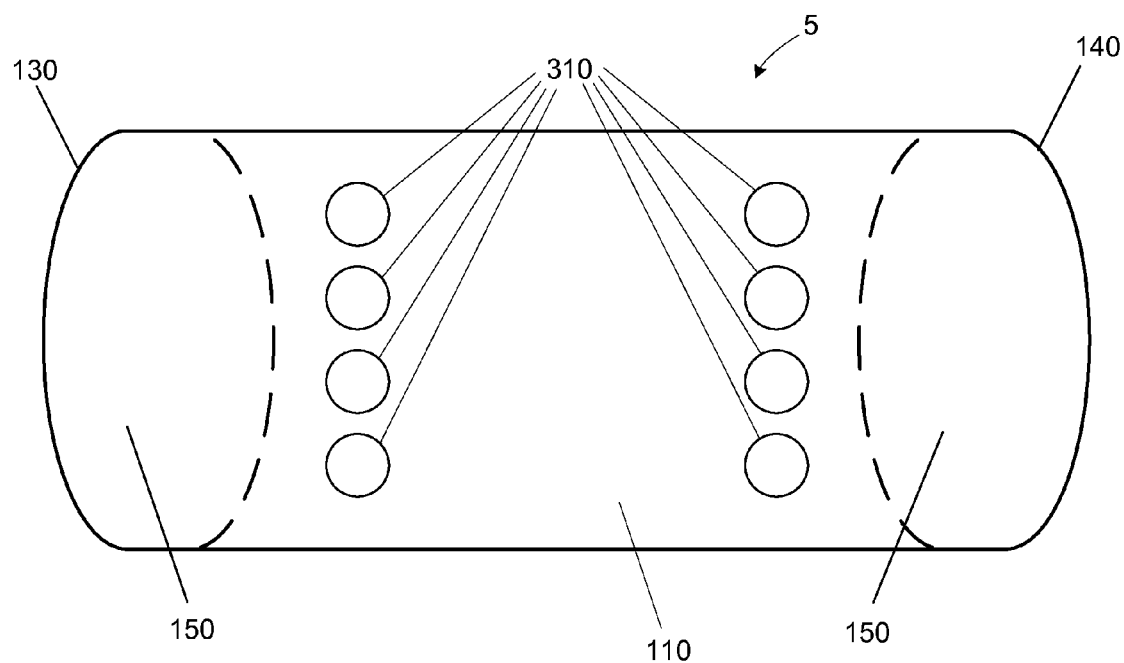
FIG. 3 depicts a rear view of an example hand-held device.

FIGS. 1-3 depict an exemplary embodiment of the present invention. As illustrated in FIG. 1, a portable device 5 is held in both hands comprising a body having an upper side 100, lower side 110, left end 130 and right end 140. Each of the left 130 and right 140 ends includes an ergonomic hand grip 150.

As illustrated in FIG. 2, the upper side 100 of the portable device 5 has a display 210, thumb keys 220a and 220b. The thumb keys 220a and 220b can be located on the upper side 100 of the body adjacent to each of the ergonomic hand grips 150. The thumb key 220a and 220b may be configured to be utilized as an input for controlling a function of a program executed on the computer device. The thumb keys 220a and 220b may also be configured to input shifts, to input a space, to control a graphical mouse, to accept predictive text suggestions, or to input an enter/return. The display 210 is sufficiently large enough to display the data entered by the user.

As illustrated in FIG. 3, the portable device 5 has at least four finger keys 310 on the lower side 110 of the body that are adjacent to the ergonomic handgrips 150. A user can input data into the portable device 5 using chorded text data entry by pressing finger keys 310 in specific order or by pressing multiple finger keys 310 simultaneously.

The introduction of visual cues on the upper side 100 of the portable device 5 will provide the context by which the habitual mind will be able to effortlessly shift between applications. In another embodiment, the body of the portable device 5 includes a computer device, and a program executed on the computer device that is displayed on the display. A first thumb key 220a may be used to input shifts (which will switch modes including capital letters, switching between text and numbers, tabs, paragraphs, gaming commands, and mathematical functions) and a second thumb key 220b will be used to select an icon that is viewable using the display 210. The second thumb key 220b is essentially serving the 'click' function of a graphical mouse. In addition, the right thumb will also serve as the Enter button on other applications, such as the return function on a word processor. The thumb keys 220a and 220b may be pressable buttons or articulable balls. The display 210 or screen may provide access to a multitude of user applications.

The improved physical keyboard interface may be used by inputting alphanumeric characters into a computer device based upon physical interaction using one or more of the four finger keys, and controlling a function of a program executed on a computer device through interaction with at least one thumb key 220a, 220b. Chorded text and data entry may be accomplished by using the four finger keys 310.

In a particular embodiment, the portable device 5 may have a shallow well or recessed area 230 that will accommodate the left thumb. The shallow well or recessed area 230 may have thumb keys 220a on each of its four sides that are contoured buttons. These thumb keys 220a will serve as the controller for a graphical mouse. By tapping a thumb key 220a once, a cursor is moved one unit, which can represent moving one cell in a spreadsheet, a letter in a word program, or to cycle through applications. By pushing against a thumb key 220a for a longer duration, the cursor will continue to move or scroll. In this embodiment, the thumb key 220b accommodating the right thumb may shift and Enter.

Previous attempts at using chorded keys on the back of the device have not caught on because of two problems. The first is that the value of mastering this UI was insufficient to warrant the effort as the application was envisioned for use on a PDA (personal digital assistant). The second problem relates to the need to develop a standard interface and interactive training mechanism. This issue is seen in the competition between game consoles, where mastery of one system inhibits development of mastery of another.

The combination of chorded keys on the back of the device and input and mouse and input keys on the front is critical for training the unconscious mind. Typists slow down when they look at the keyboard because they engage their conscious mind. The combination of not having to move your fingers and not being able to see the keys will allow for input as fast or faster than with a traditional keyboard.

While key combinations should be optimized for fast habitual learning, it is important to note that mastery will only come through repetition. The onboard training is essential to rapid mastery of the chording system. Based on current findings from neuroscience and cognitive psychology, this training is described later.

Each key is either depressed or not, representing a binary input system. With eight keys either depressed or not depressed, 256 characters can be represented. This allows for a complete representation of a traditional keyboard, plus the ability to add common words and letter groupings and for customizable chords that the user could program as they currently do for macros.

The great benefit of this UI is that it is universal. The solution can be customized for various languages via software, with no need to create a different physical layout to accommodate different language structures.

The failure of chording to catch on is largely the result of a lack of understanding of the role of the habitual mind in learning a new interface and lack of sufficient motivation to learn a 'new' way of typing. Neural tracks in the basal ganglia and striatum are strengthened through repetition and fast feedback. Previous chording solutions did not address a perceived need by the general public, so users were not willing to devote sufficient time to master the new interface. It is important to note that mastery of the QWERTY keyboard is often accomplished through formalized education—it is not an intuitive solution. However, QWERTY has been successful because it is the de facto standard and it can be mastered with sufficient practice.

This UI can be the only interface for the device and provides access to several rich applications, including word processing, spreadsheets, eBook, text messaging, internet gaming, audio/video including movies and television, and many other applications.

Onboard software will facilitate rapid habitual-mind training This software will provide a highly responsive keying system that evolves with a user's mastery. Delays of more than 350-500 hundredths of a second involve the executive mind, disrupting habitual learning. However, users learning the system will not hit the combination of keys quickly, so a delay algorithm will take this into account. As the user develops mastery, the training program will gradually speed up character recognition.

Counter intuitively, not being able to see the keys will facilitate the speed of habitual learning. The key for this process to occur is to begin with a representation of the keys on the display, roughly in accordance with their actual position on the back of the device. In the beginning, the device will give the user as long as necessary to depress the correct keys that match the letter (which will be displayed largely in the center of the screen). Over time, the user will have to depress the keys within a time limit that will grow progressively shorter. Users of this UI will develop competence after 10-20 hours of practice.

What is claimed:

1. A device having a physical keyboard interface, comprising:
    a body having an upper side, a lower side, a left end and a right end, wherein the left end and the right end each includes an ergonomic hand grip;
    a display on the upper side of the body;
    at least four finger keys on the lower side of the body adjacent to one of the ergonomic hand grips, each of the at least four finger keys having a predetermined functionality, and the at least four finger keys further configured for inputting alphanumeric characters into a computer device based upon chorded physical interaction with the at least four finger keys; and
    at least one thumb key located on the upper side of the body adjacent to one of the ergonomic hand grips, the at least one thumb key configured to be utilized as an input for controlling a function of a program executing on the computer device.

2. The device of claim 1, wherein the at least one thumb key input is a shift function.

3. The device of claim 2, wherein the at least one thumb key is further configured to shift the functionality of one or more of the at least four finger keys.

4. The device of claim 1, wherein the at least one thumb key is a pressable button.

5. The device of claim 1, wherein the at least one thumb key is an articulable ball.

6. The device of claim 5, wherein the at least one thumb key input is a scroll function.

7. The device of claim 1, wherein the at least one thumb key input is configured to accept predictive text suggestions.

8. The device of claim 1, wherein the at least one thumb key is a graphical mouse controller.

9. The device of claim 8, further comprising a recessed area surrounded by the at least one thumb key on all four sides of the recessed area.

10. The device of claim 1, wherein the computer device is enclosed within the body, and wherein the display is configured to display a program executing on the computer device.

11. The device of claim 1, wherein the display is a screen for viewing the alphanumeric characters.

12. The device of claim 11, wherein the screen provides access to a plurality of user applications.

13. A method of interaction with a computer device through a physical keyboard interface, the physical keyboard interface having a body having an upper side, a lower side, a left end and a right end, wherein the left end and the right end each includes an ergonomic hand grip, the body further comprising a display on the upper side of the body and at least four finger keys on the lower side of the body adjacent to one of the ergonomic hand grips, each of the at least four finger keys having a predetermined functionality, and at least one thumb key located on the upper side of the body adjacent to one of the ergonomic hand grips, the method comprising:
    inputting at least alphanumeric characters into the computer device based upon chorded physical interaction with the at least four finger keys, and
    controlling a function of a program executing on the computer device through interaction with the at least one thumb key.

14. The method of claim 13, wherein the controlling a function of a program executing on the computer device comprises positioning a thumb on the at least one thumb key located on the upper side of the body.

15. The method of claim 13, wherein the inputting at least alphanumeric characters into the computer device comprises using the at least four finger keys for chorded text and data entry.

16. The method of claim 13, wherein the controlling a function of a program executing on the computer device comprises using the at least one thumb key for at least one of: controlling a graphical mouse, clicking on a graphical mouse, and pressing Enter.

17. The method of claim 13, wherein the controlling a function of a program executing on the computer device comprises inputting shifts to switch modes using the at least one thumb key.

18. The method of claim 17, wherein switching modes comprises changing from a lower case letter to a capital letter, switching between text and numbers, tabbing, creating new paragraphs, and performing gaming commands and mathematical functions.

19. The method of claim 13, further comprising using the at least one thumb key to scroll over applications represented by icons viewable using the display, and to select an icon.

20. A device having a physical keyboard interface, comprising:
    a housing means having an upper side, a lower side, a left end and a right end, wherein the left end and the right end each includes an ergonomic hand grip;
    a means for displaying on the upper side of the housing means;
    at least four means for inputting on the lower side of the housing means adjacent to one of the ergonomic hand grips, each of the at least four means for inputting having a predetermined functionality, and the at least four means for inputting configured for inputting alphanumeric characters into a computer device based upon chorded physical interaction with the at least four means for inputting; and
    at least one thumb means for inputting located on the upper side of the housing means adjacent to one of the ergonomic hand grips, the at least one thumb means for inputting configured to be utilized as an input for controlling a function of a program executing on the computer device.

* * * * *